United States Patent [19]
Maruyama

[11] Patent Number: 5,959,755
[45] Date of Patent: Sep. 28, 1999

[54] LAMP APPARATUS FOR OPTICAL COMMUNICATION

[75] Inventor: Tsukasa Maruyama, Akita, Japan

[73] Assignee: Dowa Mining Co., Ltd., Tokyo, Japan

[21] Appl. No.: 08/922,135

[22] Filed: Aug. 22, 1997

[30] Foreign Application Priority Data

Aug. 27, 1996 [JP] Japan ................................ 8-244074

[51] Int. Cl.$^6$ .................................................. H04B 10/04
[52] U.S. Cl. ........................................ 359/180; 359/109
[58] Field of Search .................................. 359/109, 159, 359/169–170, 172, 180; 340/307

[56] References Cited

U.S. PATENT DOCUMENTS

| | | | |
|---|---|---|---|
| 5,278,536 | 1/1994 | Furtaw et al. | 340/310 A |
| 5,424,859 | 6/1995 | Uehara et al. | 359/172 |

*Primary Examiner*—Kinfe-Michael Negash
*Attorney, Agent, or Firm*—Frishauf, Holtz, Goodman, Langer & Chick, P.C.

[57] ABSTRACT

The improved lamp apparatus comprises at least a trough-shaped main mirror having a parabolic inner surface, a pair of plane mirrors inclined at opposite ends of said main mirror in such a way as to leave the inner surface of said main mirror open, two light-emitting devices for optical communication that are provided to face said plane mirrors, and a small mirror provided around each of said light-emitting devices to reflect light toward said plane mirrors. The mirror assembly which permits light to spread only in a horizontal direction is combined with a leadframe which assures satisfactory heat dissipation even under application of a large current, thereby creating a luminous intensity distribution pattern from the lamp apparatus that covers a wide range in the horizontal direction even if it is used alone.

5 Claims, 10 Drawing Sheets

# LAMP APPARATUS FOR OPTICAL COMMUNICATION

BACKGROUND OF THE INVENTION

This invention relates to a lamp apparatus for use in optical communication, more particularly to a lamp apparatus for use in optical communication that has a trough-shaped parabolic mirror. The invention relates specifically to a lamp apparatus for emitting light to receivers for optical communication that are arranged in a line. Stated more specifically, the invention relates to a small lamp apparatus that permits IR carried data to be transmitted in the space through angles of ±60 degrees on the horizontal 4 m ahead, namely, in a line about 7 m long to either right or left.

FIG. 11 shows the layout of conventional systems of indoor local area network (LAN), a language laboratory (LL) learning facility, an amusement facility such as pin-ball machines (pachinko in Japanese) and cash registers in a department store. Individual machines 111–114 arranged in a line several meters long on both the right and left sides communicate data with a controller 110 via dedicated cables 121 and 122. A problem with this system is that if the machines 111–114 are changed in position or if additional machines 115–117 are installed, cabling work must also be done in the ceiling 131, walls 132 and on the floor 133, requiring much cost and time. In addition, performing a complex cabling operation on more than one machine has been a labor-intensive job.

If IR light is used as a carrier, data can be transmitted through the space without using the dedicated cables 121 and 122. Data communication using an IR light-emitting diode (LED) has heretofore been used in limited applications but due to the structural constraints of the leadframe in the LED, the current that can be applied is limited and in order to achieve consistent data transmission over a long distance, many IR lamps are necessary, resulting in an increased cost. As will be apparent from FIG. 13, the current that can be applied is limited simply because the leadframe 811 of the LED 411 which is a component of the lamp 511 has a very small cross-sectional area; in other words, the heat channels available are so narrow that the heat generated by the LED 411 in operation cannot be dissipated to the ambient very rapidly.

A further problem with the prior art is that no lamp has been available that can distribute IR light over a broad range in both right and left directions. To overcome this difficulty, several LED lamps are combined to fabricate a desired lamp assembly as shown in FIG. 14. However, the lamp assembly 611 takes much time to construct since a plurality of individual lamps 511 have to be assembled and, what is more, the fabricated lamp assembly 611 is too bulky to be used in a limited space. In addition, as shown in FIG. 15, the combination of lamps 511 provides a luminous intensity distribution pattern 711 that covers a wide range in a horizontal direction but, at the same time, unwanted light is emitted in a vertical direction, simply resulting in a waste of electric power.

Stated briefly, the combination of IR lamps has already been proposed in order to provide a luminous intensity distribution pattern that covers over a broad range in a horizontal dIRection and which is far reaching; however, assembling a plurality of IR lamps is time-consuming and, in addition, the light issuing in a vertical direction is simply a waste of energy.

SUMMARY OF THE INVENTION

The present invention has been accomplished under these circumstances and has as an object providing a lamp apparatus in which a mirror assembly that permits light to spread only in a horizontal direction is combined with a leadframe that assures satisfactory heat dissipation even under application of a large current, thereby creating a luminous intensity distribution pattern from the lamp apparatus that covers a wide range in the horizontal direction, even if it is used alone.

As a result of the intensive studies conducted in order to attain the stated object, the present inventors found that changing the shape of the lens in the conventional IR lamp shown in FIG. 13 was insufficient for the purpose of providing a luminous intensity distribution pattern that covered a wide range in a horizontal direction and which yet limited the waste of light in a vertical direction.

The inventors continued their studies and found that for half-angles desired the directivity of a light beam could be obtained by combining the lens with a novel mirror component. Based on this finding, the inventors developed a leadframe that did not interfere with the travel of the light reflected from the mirror and which had a sufficiently high heat conductivity to ensure that the heat generated from the LED operating under the application of a large current could be efficiently dissipated from the lamp apparatus. The present invention has been accomplished on the basis of these findings.

Thus, in one aspect of the invention, there is provided a lamp apparatus for optical communication that comprises at least a trough-shaped main mirror having a parabolic inner surface, a pair of plane mirrors inclined at opposite ends of said main mirror in such a way as to leave the inner surface of said main mirror open, two light-emitting devices for optical communication that are provided to face said plane mirrors, and a small mirror provided around each of said light-emitting devices to reflect light toward said plane mirrors.

In another aspect of the invention, there is provided a lamp apparatus for optical communication that comprises at least a trough-shaped main mirror having a parabolic inner surface with a focal length A of 2±0.1 mm, a pair of plane mirrors each having the center in such a position that the distance B from the central axis through said trough-shaped main mirror toward said center on either side is 6.5±0.1 mm and the height C from the inner surface of the bottom of said main mirror is 1.0±0.1 mm, each of said plane mirrors being inclined at an angle D of 35±1 degrees with respect to the inner surface of the bottom of said main mirror such as to leave the inner surface of said main mirror open two light-emitting devices for optical communication, each provided in such a position that the distance E from the central axis through said main mirror toward either light-emitting device is 5.9±0.1 mm and that the height from the inner surface of the bottom of said main mirror coincides with the position corresponding to said focal length A, and a small mirror that is provided around each of said light-emitting devices, that is shaped like a deep dish, that has a bottom diameter F of 0.58±0.03 mm and a depth G of 0.2±0.03 mm, with the peripheral wall having an angle H of 90±2 degrees, and that is provided in such a way as to reflect light toward said plane mirror.

In a preferred embodiment of the invention, a leadframe is fitted in a rectangular annular opening defined by said main mirror and said one pair of plane mirrors, said leadframe having an opening with a width J of 13±1 mm and a depth K of 7.4±1 mm and also having a thickness I of 0.1–5 mm.

DETAILED DESCRIPTION OF THE INVENTION

In order to solve the aforementioned problems of the prior art, the present inventors first attempted to keep down the spread of light in a vertical direction. To this end, a light-emitting device 4 such as an LED was positioned at the focus of a trough-shaped main mirror 1 having a parabolic inner surface such that the light issuing from the LED would be reflected by the mirror to emerge as parallel rays (see the schematic section in FIG. 3). The focal length A (see FIG. 2) of the main mirror is preferably 2±0.1 mm as will be discussed just below.

Figure 3:
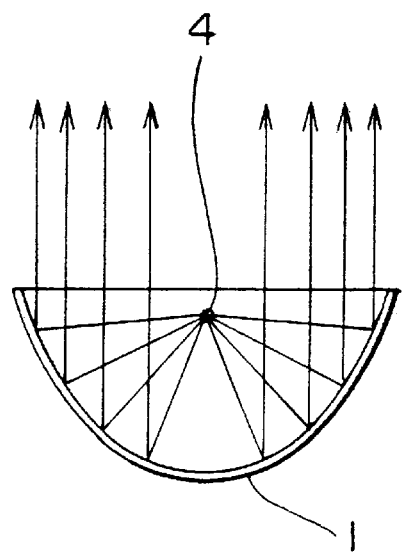
FIG. 3 is a schematic section showing how light is reflected from the trough-shaped parabolic main mirror in the embodiment of the invention.
Figure 4:
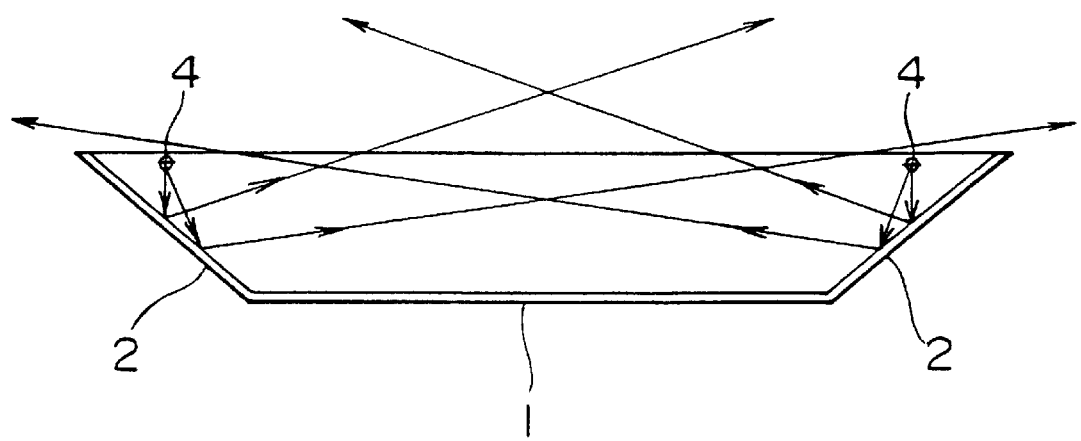
FIG. 4 is a schematic section showing how light rays are reflected from the plane mirrors in the embodiment of the invention.
Figure 5:
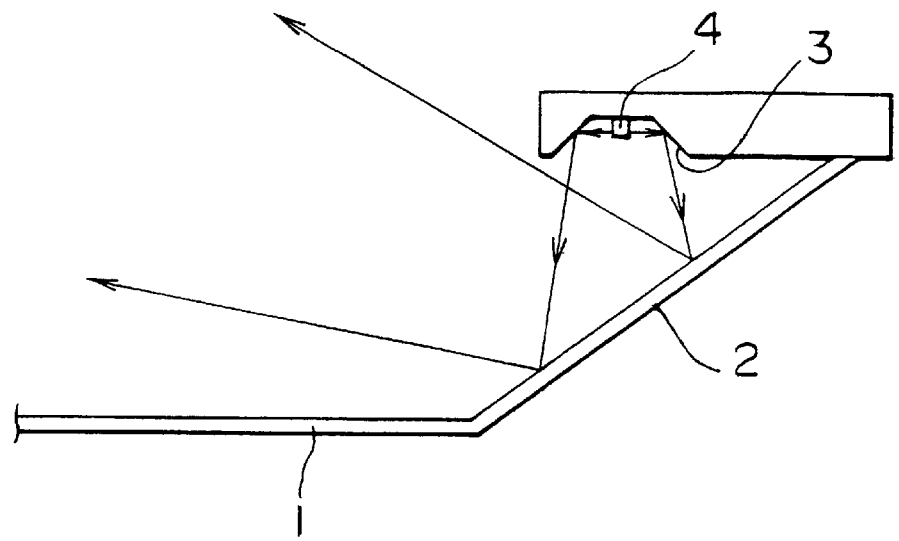
FIG. 5 is a schematic section showing how light rays are reflected from one of the mirrors shaped like a deep dish in the embodiment of the invention.

In the next step, in order to spread light over a wide range in a horizontal direction, a light-emitting device 4 such as an LED was positioned at both ends of the trough-shaped parabolic main mirror 1, with a plane mirror 2 being inclined in a face-to-face relationship with each LED (see FIG. 4 which is a schematic side sectional view of FIG. 3).

Stated specifically, a slightly elongated main mirror 1 having a parabolic trough shape with a focal distance of 2±0.1 mm is provided. A pair of plane mirrors 2 are provided at opposite ends of the main mirror, each having the center in such a position that the distance B from the central axis 1C through the main mirror 1 toward said center on either side is 6.5±0.1 mm and that the height C from the inner surface of the bottom of the main mirror 1 is 1.0±0.1 mm, each of said plane mirrors being inclined at an angle D of 35±1 degrees with respect to the inner surface of the bottom of the main mirror 1.

Additionally, in order to ensure that the light from the LED 4 would strike the plane mirrors 2 as much as possible, a small mirror 3 in the form of a deep dish was provided around each LED to thereby guide the lateral spreading light from the LED to travel in a forward direction.

Stated more specifically, two small mirrors 3 shaped like a deep dish were provided to flare toward the plane mirrors 2 in such a position that the distance E from the central axis 1C through the trough-shaped parabolic main mirror 1 toward either LED is 5.9±0.1 mm and that the height from the inner surface of the bottom of the main mirror 1 coincides with the position corresponding to the focal length A (=2.0±0.1 mm), and each of said small mirrors 3 has a bottom diameter F of 0.58±0.03 mm and a depth G of 0.2±0.03 mm, with the peripheral wall having an angle H of 90±2 degrees.

Figure 6:
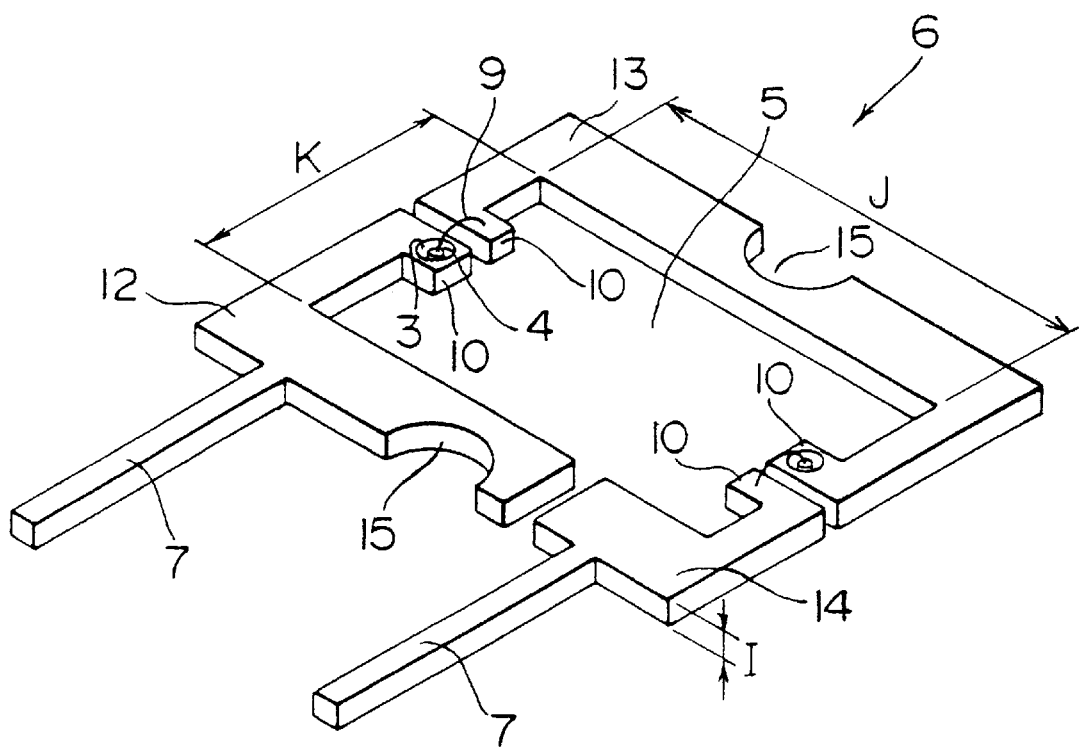
FIG. 6 is a perspective view showing an example of the leadframe in the embodiment of the invention.

Further, in order to ensure that the reflected light could emerge from the apparatus unimpeded to travel through the space, the present inventors developed a leadframe that is generally of a rectangular annular shape and which has a large opening 5 as shown in FIG. 6. The opening 5 of the leadframe generally indicated by 6 in FIG. 6 has a depth K of 7.4±1 mm, a width J of 13±1 mm and a thickness I of 0.1–5 mm, preferably 0.5–3 mm.

The thickness I of the leadframe ranges from 0.1 to 5 mm, preferably from 0.5 to 3 mm, for the following reasons:

(1) if the thickness of the leadframe exceeds 5 mm, light will strike lateral sides of the leadframe and cannot spread effectively in a horizontal direction;

(2) if the thickness of the leadframe is less than 0.1 mm, its cross-sectional area is insufficient to ensure that the heat generated from the chip in operation can be rapidly dissipated to the ambient; in addition, the leadframe deflects under the weight of the trough-shaped main mirror and not only does this preclude the mounting of the lamp but it also increases the chance of breaking of the leadframe bases upon prolonged use; and (3) considering the blocking of light by the lateral sides of the leadframe, as well as thermal conductivity and mechanical strength, the prepared range of the leadframe thickness is from 0.5 to 3 mm.

The leadframe 6 consists of three portions as shown specifically in FIG. 6. The first portion 12 is generally L-shaped and includes a small lug 10 and a comparatively large lead 10. The lug 10 has a small mirror 3 engraved in the form of a deep dish for mounting the first LED 4, and the lead 7 provides connection to an external circuit. The second portion 13 is generally of an inverted U shape and includes two small lugs 10, the first one for wiring the first LED 4 and the second one having a small mirror 3 engraved in the form of a deep dish for mounting a second LED 4. The third portion 14 includes a small lug 10 for wiring the second LED 4 and a comparatively large lead 7. The leadframe 6 has two semicircular mounting holes 15 on opposite sides.

The present inventors also provided two measures for allowing light to travel a far distance ahead. The first measure was to connect two LEDs 4 in series as shown in the equivalent wiring diagram of FIG. 7 so that the quantity of light that could be produced was twice as much as the light issued from one LED. The second measure was to ensure that a sufficiently large current would flow through the LED 4 to increase the quantity of light that could be issued. In other words, a thick plate of leadframe 6 was formed of a material that was so selected as to ensure that the heat generated from the LED 4 during its operation would be efficiently conducted to the ambient to thereby prevent the breakdown of the device.

Figure 1:
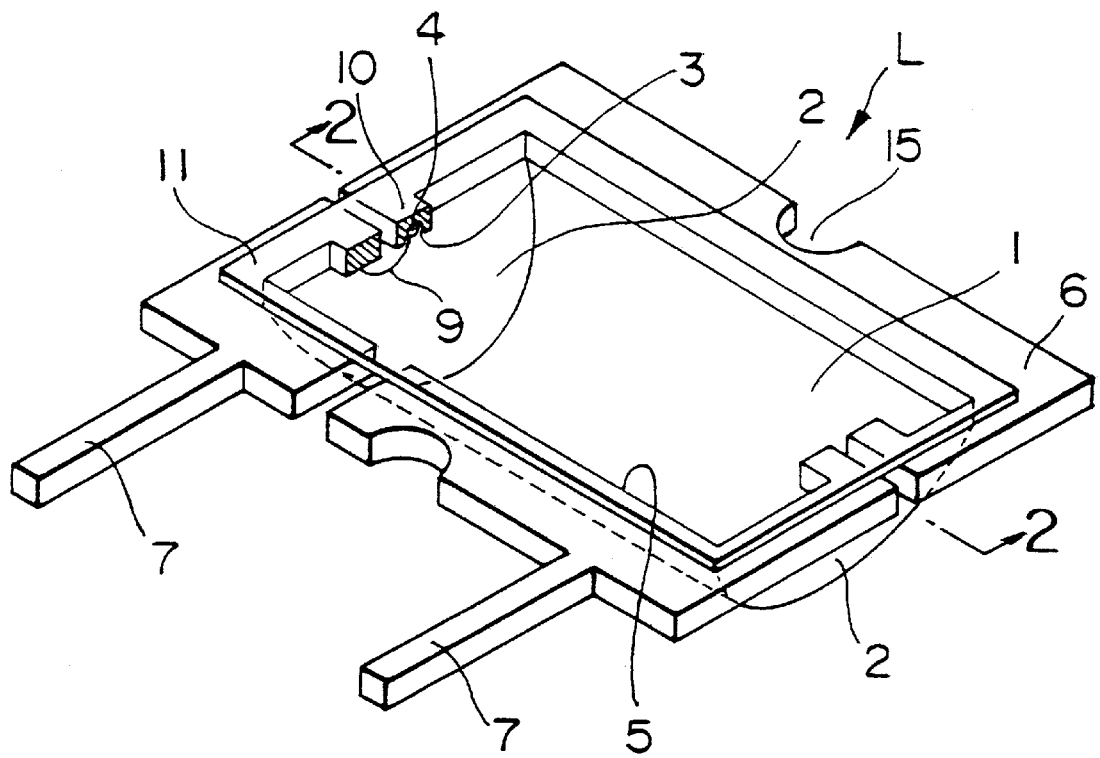
FIG. 1 is a perspective view showing an embodiment of the invention.
Figure 2:
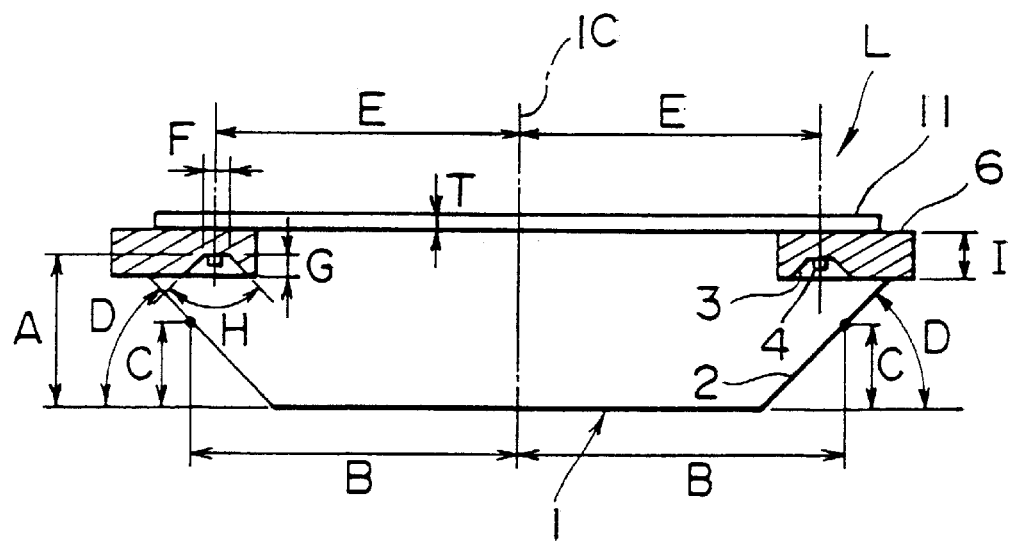
FIG. 2 is a schematic section taken on line a of FIG. 1.

An embodiment of the invention which incorporates all of the features described above is shown in perspective in FIG. 1 and in schematic section in FIG. 2.

Figure 8:
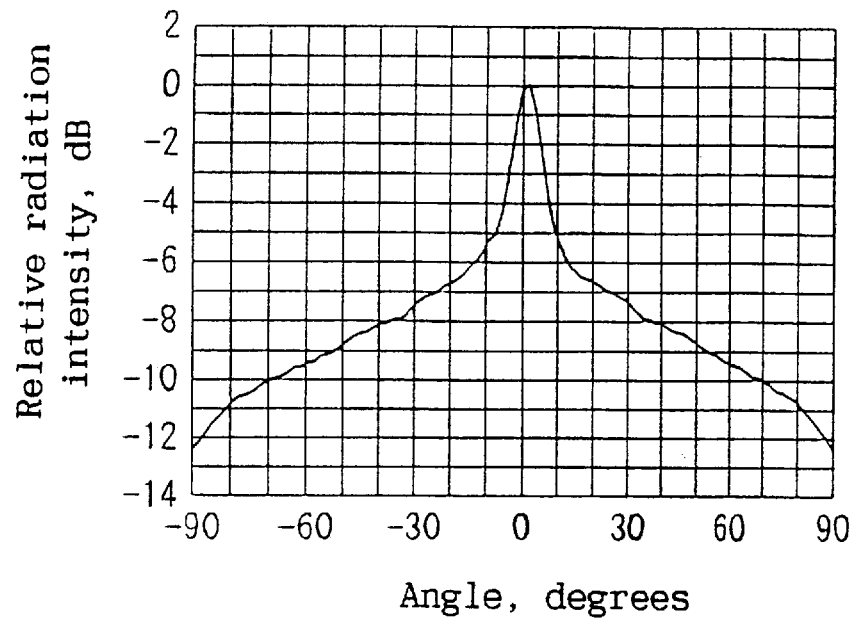
FIG. 8 shows a luminous intensity distribution pattern that is provided in a vertical direction according to the embodiment of the invention.
Figure 9:
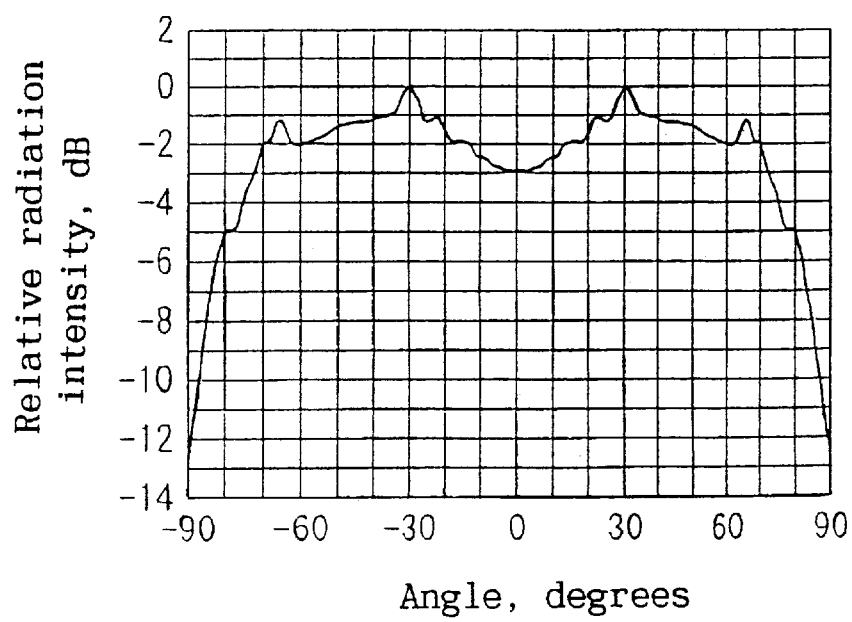
FIG. 9 shows a luminous intensity distribution pattern that is provided in a horizontal direction according to the embodiment of the invention.

An example of the invention will now be described with reference to accompanying drawings, in which FIG. 1 is a perspective view showing an example of the lamp apparatus according to the invention, FIG. 2 is a section taken on line a of FIG. 1, FIG. 8 shows the luminous intensity distribution pattern that is provided in a vertical direction according to the example of the invention, and FIG. 9 shows the luminous intensity distribution pattern that is provided in a horizontal direction according to the example of the invention.

FIG. 1 shows schematically the structure of a lamp apparatus according to an example of the invention. As shown, the lamp apparatus generally indicated by L comprises a trough-shaped parabolic main mirror 1, two plane mirrors 2 inclined to close the opposite ends of the main mirror 1, a thick leadframe 6 that has a large opening 5 and which supports the peripheral edges of the rectangular annular shape which is defined by the main mirror and the plane mirrors, and a flat window 11 supporting the entire assembly.

The leadframe 6 has small mirrors 3 in the form of a deep dish that are disposed to flare toward the respective plane mirrors 2. An LED 4 serving as a light source is provided in each of the small mirrors 3.

The positions in which the individual components are mounted will now be described in greater detail with reference to FIG. 2. It is well known that a nondirectional light source positioned at the focus of a parabolic mirror causes the reflected light from the mirror to travel as parallel rays. This phenomenon may be used to keep down the spread of light in a vertical direction and to this end, an LED 4 working as a light source is mounted at the point corresponding to the focal length A of the trough-shaped parabolic main mirror 1.

Stated more specifically, in order to ensure that issued light will spread widely in a horizontal direction both to the right and the left, the LED 4 is positioned at a distance of E in both right and left directions from the central axis 1C through the trough-shaped parabolic main mirror 1, and the plane mirror 2 is positioned just beneath each LED such that its center is spaced from the central axis 1C by a distance of B and by a height of C from the bottom of the main mirror 1 as it is inclined by an angle of D.

Figure 7:
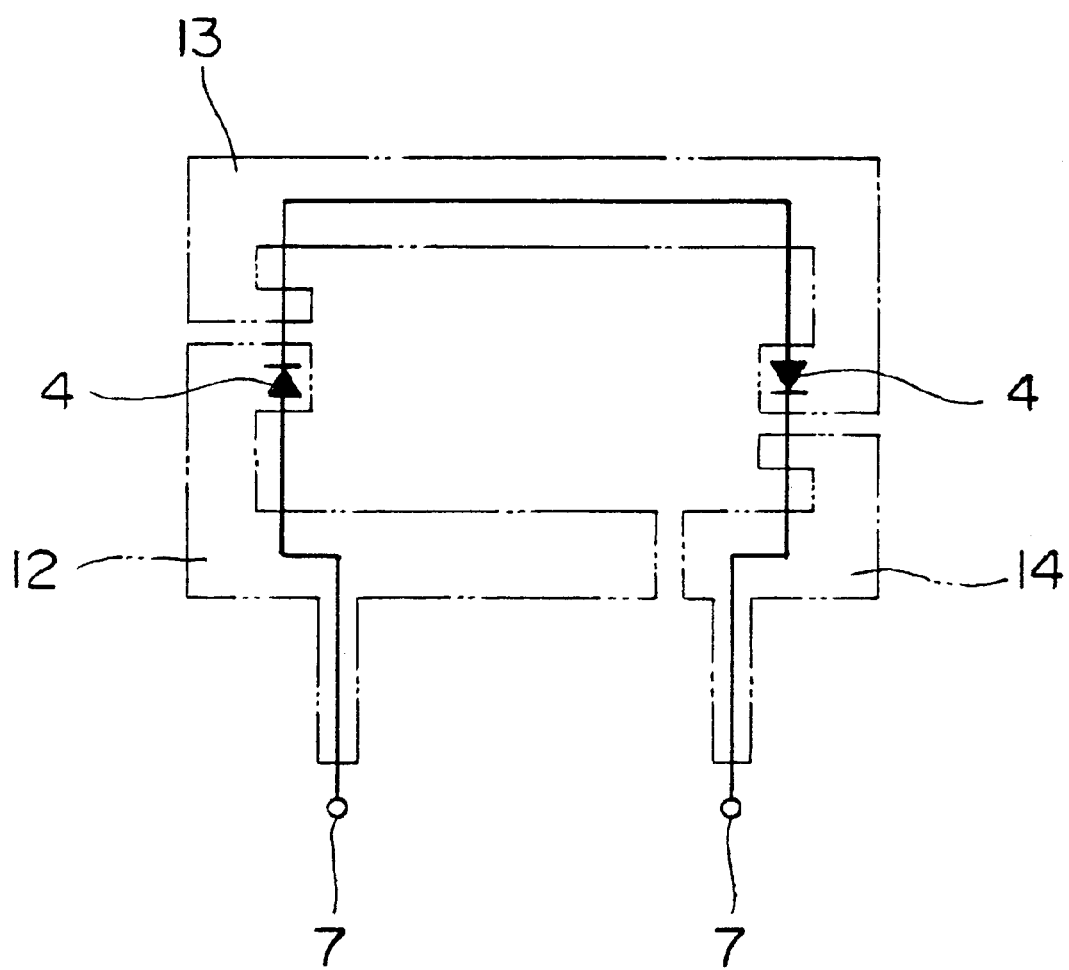
FIG. 7 shows an equivalent circuit for the embodiment of the invention.

In order to ensure that a large portion of the light from the LED 4 will strike the plane mirror 2, a small mirror 3 in the form of a deep dish having a bottom diameter of F, a depth of G and an angle of H is positioned at the same height as the focal distance A with a distance of E spaced from the central axis 1C toward either the right or left. The small mirror 3 shaped like a deep dish may typically be formed by engraving selected areas of the leadframe 6. The LED 4 is bonded to the center of the bottom of each of the small mirrors 3 and provided with a wiring 9 to permit current application. As a result of the wiring 9, the two LEDs 4 are connected in series as shown in FIG. 7.

In order to provide good heat conduction, the leadframe 6 has a thickness of I and is provided with an opening 5 having a width J and a height (or depth) of x that are great enough to permit effective passage of the light reflected from the main mirror 1 and the plane mirrors 2. Lugs 10 for mounting the LEDs 4 and for providing wirings 9 are formed at opposite ends of the opening 5 but due to their small size (ca. 1.2 mm in both length and width), these lugs will not cause any adverse effects on the luminous intensity distribution pattern to be produced.

As shown in FIG. 2, the opening 5 is fitted with a flat window 11 made of a transparent rigid plate having a height (or thickness) T of 1 mm. This window 11 holds the leadframe 6 in cooperation with the mirror assembly to thereby reinforce the leadframe 6 in supporting the mirror assembly. Of course, the flat window 11 fitted in the opening 5 will not cause any adverse effects on the luminous intensity distribution pattern to be produced.

The example under consideration will now be described more specifically below. The leadframe 6 was made of an oxygen-free copper plate having a thickness of 1.0 mm, a width of 17 mm and a depth of 15 mm, which was shaped to have two 1-mm wide leads 7 protruding by a length of 5 mm. The oxygen-free copper was adopted since it had a thermal conductivity of 0.93 cal/cm·sec·° C., which was high enough to ensure that the heat generated from the LED in operation could be rapidly conducted to the ambient.

The leadframe 6 was also provided with an opening 5 having a width J of 13 mm and a depth K of 7.4 mm and at either end of the opening 5 in the direction of width, two lugs 10 each having a length of 1.2 mm and a width of 1.2 mm were formed to protrude inwardly at a spacing of 1.0 mm for mounting the LED 4 and for providing the wiring 9.

The spacing between adjacent lugs 10 may be of any value as long as the wiring 9 can be provided. It should, however, be mentioned that the lug 10 for mounting the LED 4 is desirably formed on the central axis through the leadframe 6 close to the line a running along the width J of the leadframe.

In addition, the lugs 10 formed at opposite ends of the leadframe 6 for mounting the LEDs 4 were engraved with deep dishes in positions spaced from the central axis 1C through the leadframe 6 (or the main mirror 1) by a distance E of 5.9±0.1 mm toward both right and left in such a way that each dish had a bottom diameter F of 0.58±0.03 mm, a depth G of 0.2±0.03 mm and an angle H of 90±2 degrees. Thus, the leadframe 6 consisted of three portions as shown in FIG. 6. The first portion 12 included the lug 10 and the lead 7, the lug 10 being engraved with the small mirror 3 in the form of a deep dish for mounting the first LED 4. The second portion 13 included the first lug 10 for providing a wiring 9 on the first LED 4 and the second lug 10 engraved with a small mirror 3 in the form of a deep dish for mounting the second LED 4. The third portion 14 included the lug 10 for providing a wiring 9 on the second LED 4 and the lead 7. As also shown in FIG. 6, the leadframe 6 had two holes with a diameter of 2.3 mm that permitted the lamp apparatus to be easily mounted on various kinds of equipment by means of screws.

In order to secure efficient light reflection, all surfaces of the leadframe 6 were plated with a nickel primer coat in a thickness of 1 μm which, in turn, was plated with a silver coat in a thickness of 2 μm.

Two IR LEDs 4 were used, each emitting at a wavelength of 880 nm, having a response frequency of 12 MHz and producing an optical output power of 2.0 mW with a dc current of 20 mA. Although not shown specifically, each LED was square in cross section having a length of 370 μm on one side and a height of 160 μm. A gold electrode with a diameter of 140 μm was attached to top of each LED and provided with a wiring 9 by means of a gold wire having a diameter of 30 μm.

Two molds were provided; one of them (not shown) was in such a shape that both ends of a parabolic trough similar to the main mirror 1 were cut off in a specified position at a specified angle by a plane similar to the plane mirror 2, and the other mold (also not shown) was for forming the flat window 11. The leadframe 6 having the LEDs 4 mounted thereon was held between the two molds, with the LEDs 4 facing the flat sides of the respective plane mirrors 2, and a clear epoxy resin was injected into the mold assembly through a gate, allowed to set at a specified temperature in a specified time and demolded.

The main mirror 1 and the plane mirrors 2 were prepared by evaporating silver on the demolded resin portion. The respective mirror surfaces were spray coated with an acrylic resin in order to render them scratch-resistant. In the silvering operation, electrical shorting may occur between the leadframe 6 and the mirror surface; in order to prevent this trouble, a mask was provided over a distance 0.1 mm inward of the edges of the leadframe 6 to thereby ensure that no silver was deposited in those areas. A lamp apparatus L as shown in FIG. 1 was fabricated selecting the following values for the dimensional and angular parameters shown in FIG. 2: A=2±0.1 mm; B=6.5±0.1 mm; C=1.0±0.1 mm; D=35±1 degrees; E=5.9±0.1 mm; F=0.58±0.03 mm; G=0.2±0.03 mm; H=90±2 degrees.

The lamp apparatus L was found to produce the luminous intensity distribution patterns shown in FIG. 8 (in a vertical direction) and FIG. 9 (in a horizontal direction). The horizontal axis of each graph plots the angle in degrees and the vertical axis plots the relative radiation intensity in decibels. Thus, the window 11 through which the light from the lamp apparatus L is radiated covers the area defined by 90 degrees in both horizontal and vertical directions.

According to the pattern shown in FIG. 8, the relative radiation intensity in the vertical direction of the light issuing from the lamp apparatus L dropped below −3 dB only in a narrow angular range from −4 to +6 degrees with respect to the vertical line through the front of the lamp. Thus, the leakage of light in the vertical direction which was encountered in the prior art could be effectively reduced by the present invention.

According to the pattern shown in FIG. 9, the relative radiation intensity in the horizontal direction of the light issuing from the lamp apparatus L dropped below −3 dB in a broad angular range of ±72 degrees with respect to the vertical line through the front of the lamp. Thus, it was verified that a wide luminous intensity distribution pattern could be obtained with a single lamp apparatus without using a plurality of lamps that were conventionally mounted at varying angles.

Figure 10:
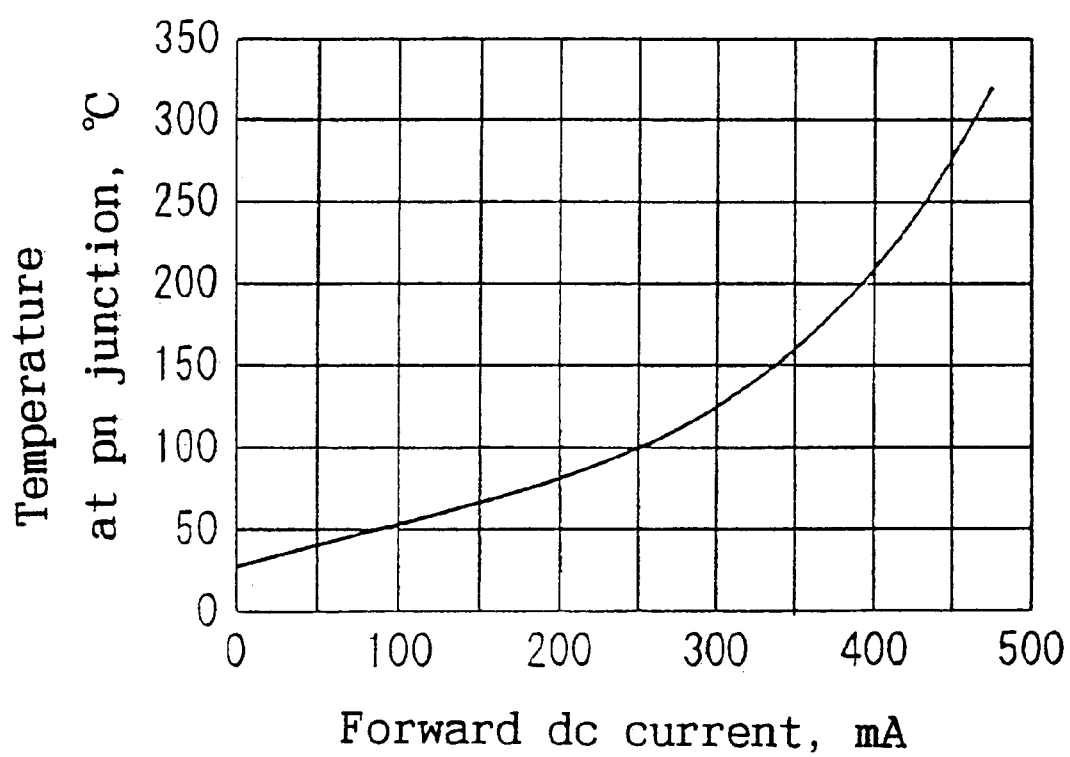
FIG. 10 is a characteristic diagram showing the temperature at pn junction vs the dc current applied in a forward direction according to the embodiment of the invention.
Figure 11:
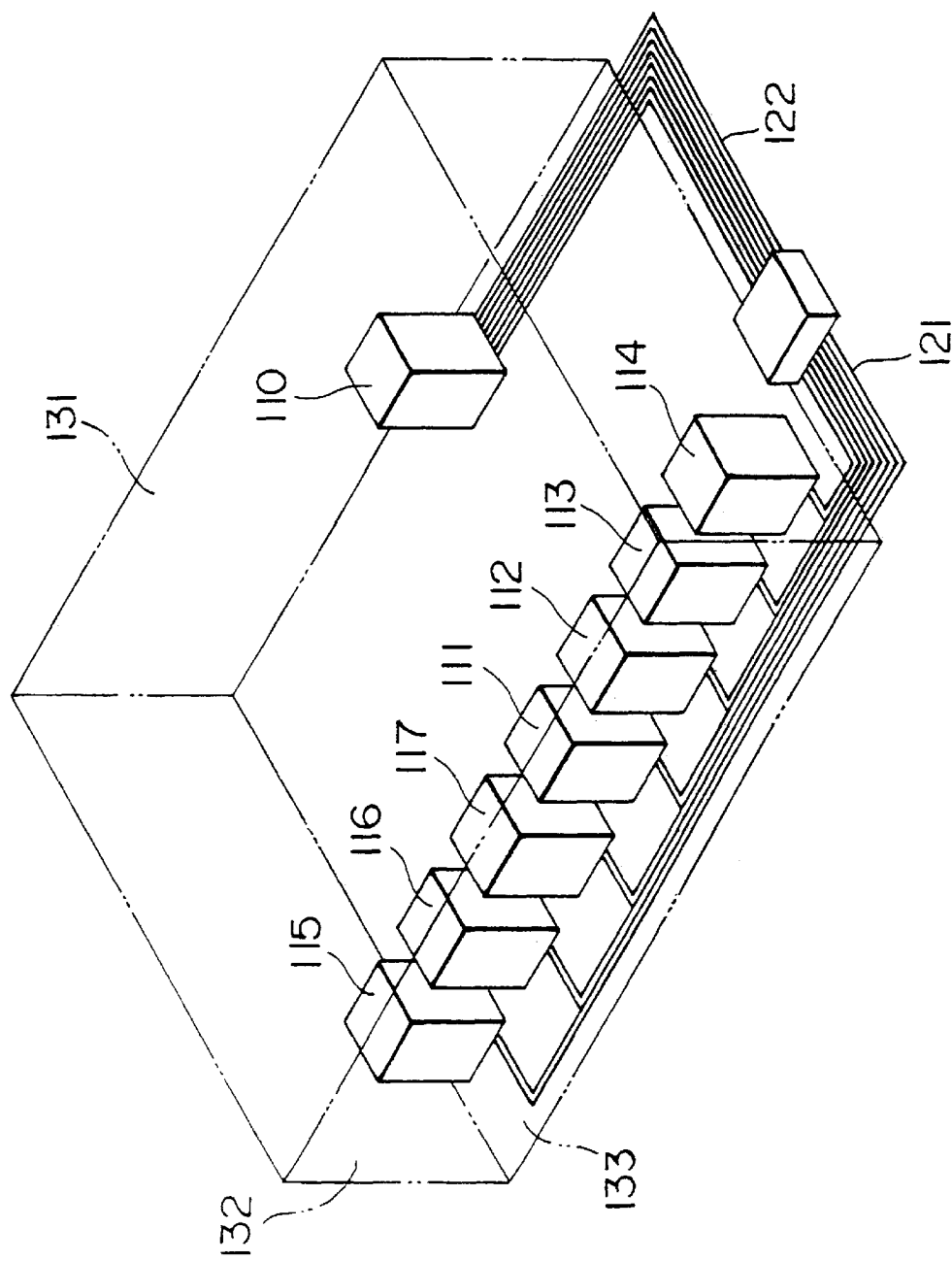
FIG. 11 is a perspective view showing schematically how data receivers are arranged in a conventional data communication system.
Figure 12:
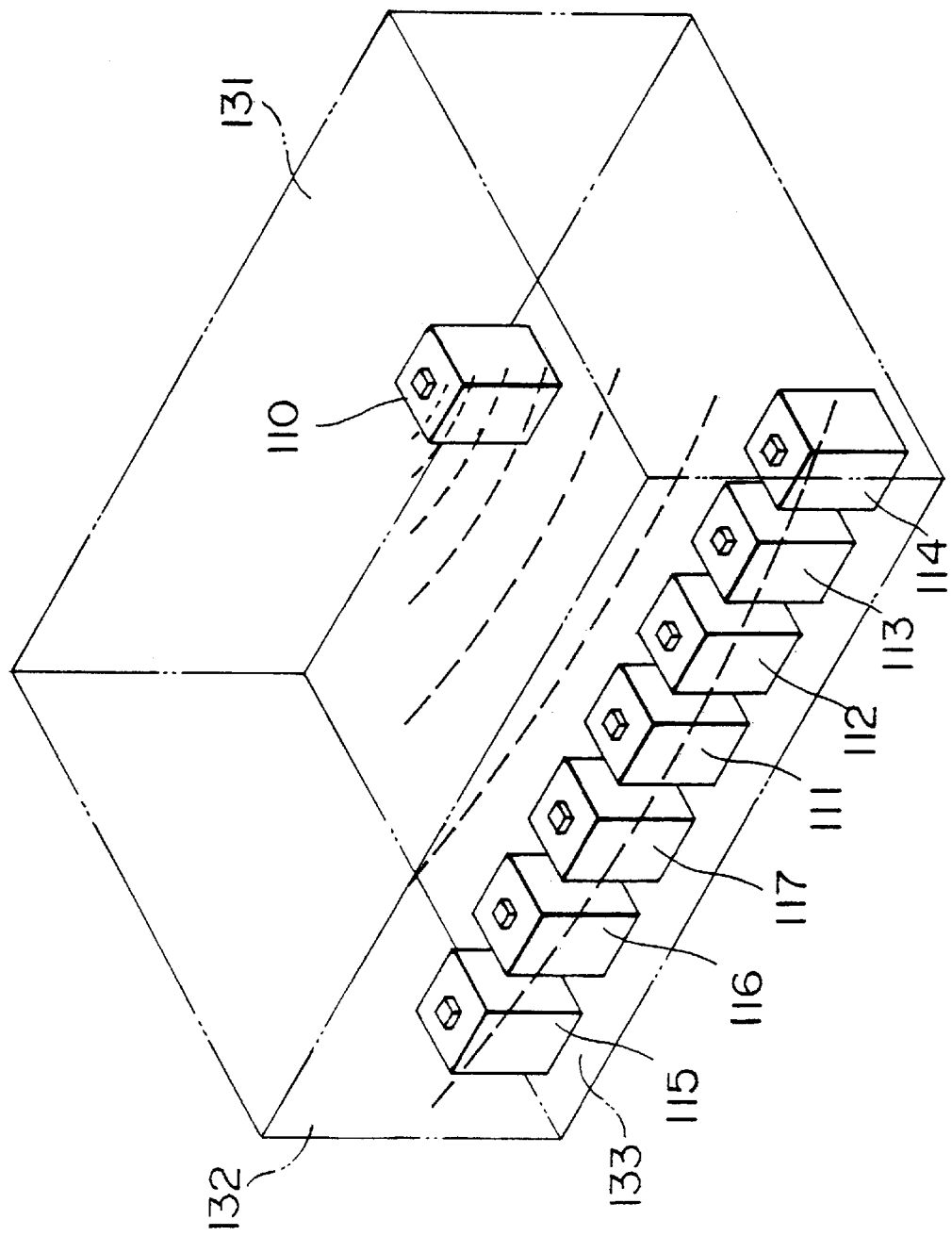
FIG. 12 is a perspective view showing schematically how data receivers are arranged in another conventional data communication system.

The lamp apparatus L fabricated in accordance with the present invention was operated and the heat generated from the LEDs 4 was measured in the ambient at ordinary temperature and humidity. The results are shown in FIG. 10; the horizontal axis of the graph in FIG. 10 plots the dc current applied to the lamp apparatus L and the vertical axis plots the temperature of the pn junction which is indicative of the heat generated from the LEDs 4 in operation. Obviously, more heat is generated from the LEDs 4 as more current is applied to the lamp apparatus L.

Figure 13:
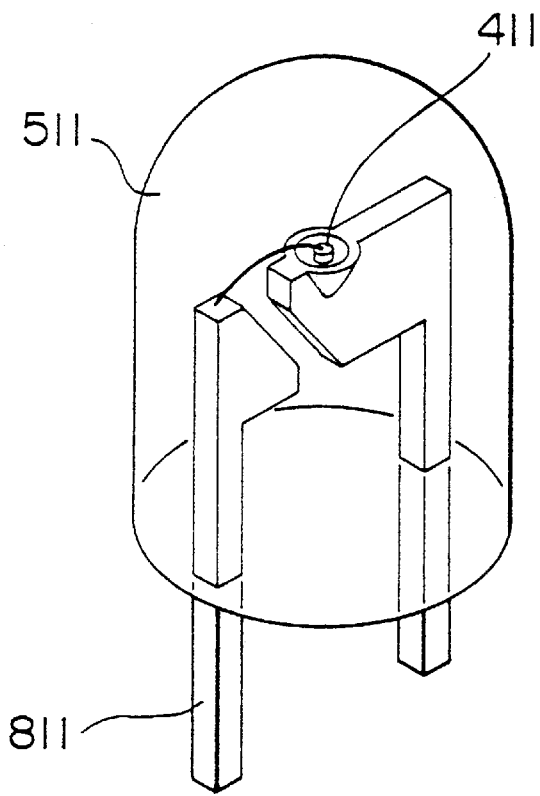
FIG. 13 is a perspective view of a prior art IR lamp.
Figure 14:
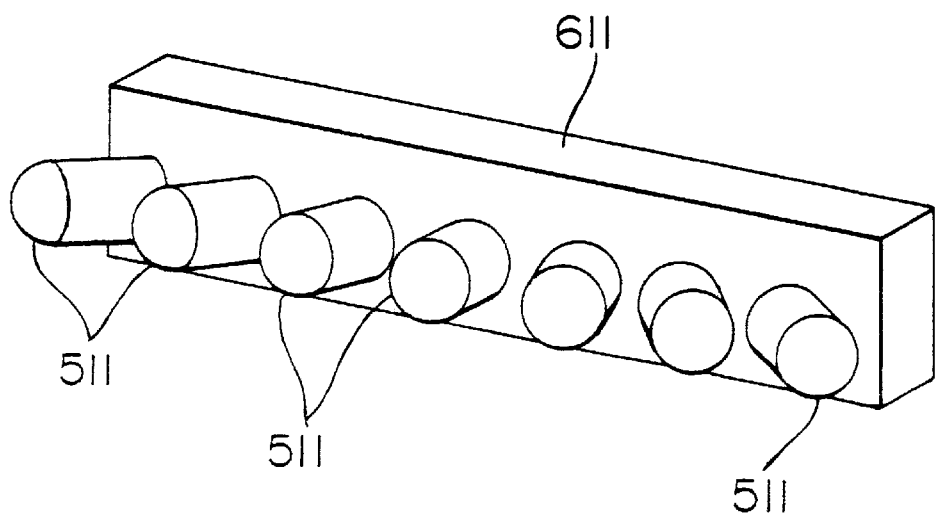
FIG. 14 is a perspective view showing how a plurality of IR lamps are mounted to make a single lamp assembly in a prior art case.
Figure 15:
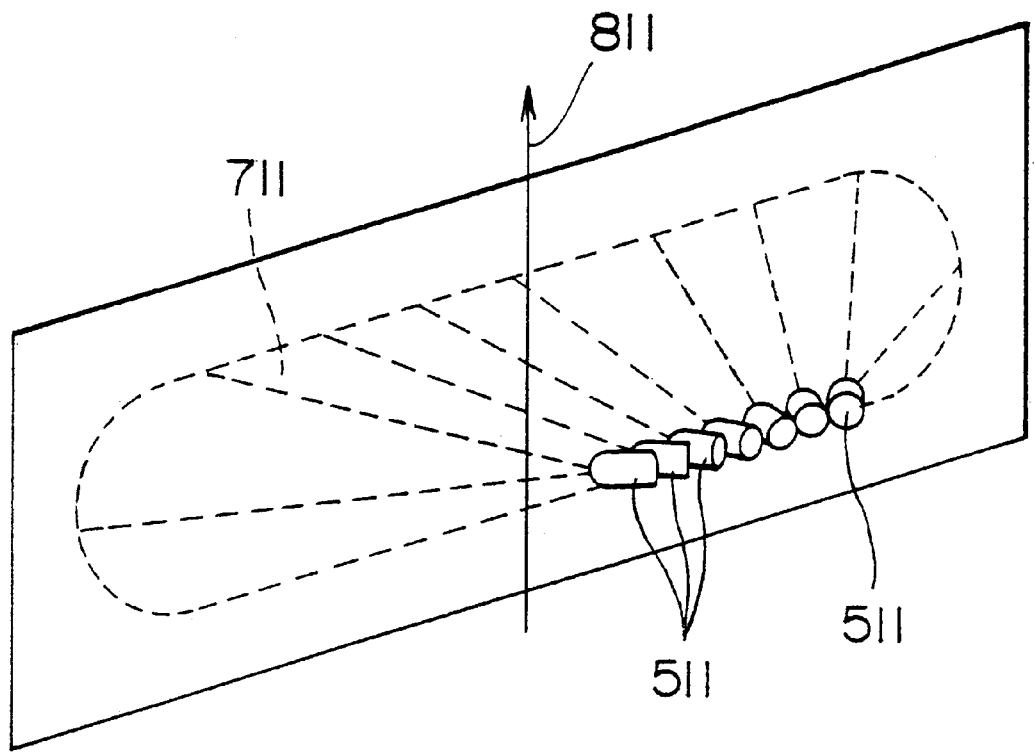
FIG. 15 illustrates a light distribution pattern obtained in the prior art case.

The LEDs 4 will be fatigued if they are kept in operation with the pn junction at an elevated temperature and they will eventually fail after prolonged operation. If 120° C. is taken as a guide for the critical temperature at which such failure occurs, it is known that this critical point is reached by a conventional lamp 511 (see FIG. 13) when it is supplied with a current of 120–180 mA. On the other hand, a current up to 250–300 mA could be applied to the lamp apparatus L of the invention. In other words, the present invention allowed a sufficiently large current to be applied to increase the optical output power, thereby enabling the light to travel a longer distance ahead.

If the leadframe 6 is fitted with suitable heat dissipating fins, the generated heat can be dissipated into the ambient space more efficiently and, as a result, the applicable current can be further increased to about 400–450 mA dc.

Therefore, in sharp contrast with the prior art case in which a plurality of lamps have to be combined, the present invention required only one lamp apparatus L to create light covering a wide range in the horizontal direction and which could be allowed to travel a satisfactorily long distance ahead.

As described on the foregoing pages, the present invention offers a great advantage in that by means of combining a reflector mirror with a leadframe in such a way as to satisfy the specified shape, size, position and angle requirements, a lamp apparatus can be constructed which enables data to be transmitted in a line over a long horizontal distance in both right and left directions even if it is used alone.

Since the lamp apparatus of the invention produces a useful luminous intensity distribution pattern and optical output power without employing more than one lamp, the invention offers another great advantage in that the overall size of the apparatus is reduced.

What is claimed is:

1. A lamp apparatus for optical communication comprising the following components (a)–(d):

(a) a trough-shaped main mirror having a parabolic inner surface;

(b) a pair of plane mirrors inclined at opposite ends of said main mirror in such a way as to leave the inner surface of said main mirror open;

(c) two light-emitting devices for optical communication that are provided to face said plane mirrors; and (d) a small mirror provided around each of said light-emitting devices to reflect light toward said plane mirrors.

2. A lamp apparatus for optical communication comprising the following components (a)–(d):

(a) a slightly elongated trough-shaped main mirror having a parabolic inner surface with a focal length A of 2±0.1 mm;

(b) a pair of plane mirrors each having the center in such a position that distance B from the central axis through said trough-shaped main mirror toward said center on either side is 6.5±0.1 mm and the height C from the inner surface of the bottom of said main mirror is 1.0±0.1 mm, each of said plane mirrors being inclined at an angle D of 35±1 degrees with respect to the inner surface of the bottom of said main mirror such as to leave the inner surface of said main mirror open;

(c) two light-emitting devices for optical communication, each provided in such a position that the distance E from the central axis through said main mirror toward either light-emitting device is 5.9±0.1 mm and that the height from the inner surface of the bottom of said main mirror coincides with the position corresponding to said focal length A; and (d) a small mirror that is provided around each of said light-emitting devices, that is shaped like a deep dish, that has a bottom diameter F of 0.58±0.03 mm and a depth G of 0.2±0.03 mm, with the peripheral wall having a flare angle H of 90±2 degrees, and that is provided in such a way as to reflect light toward said plane mirror.

3. A lamp apparatus according to claim 2, which is fitted with a leadframe in a rectangular angular opening defined by said main mirror and said one pair of plane mirrors, said leadframe having an opening with a width J of 13±1 mm and a depth K of 7.4±1 mm and also having a thickness I of 0.1±5 mm.

4. A lamp apparatus similar in shape to the apparatus of claim 2 and of which the corresponding parts have dimensions determined by enlarging or reducing those set forth in claim 2 by a specified factor.

5. A lamp apparatus similar in shape to the apparatus of claim 3 and of which the corresponding parts have dimensions determined by enlarging or reducing those set forth in claim 3 by a specified factor.

* * * * *